(12) United States Patent
Toko et al.

(10) Patent No.: US 10,551,018 B2
(45) Date of Patent: Feb. 4, 2020

(54) VEHICULAR LAMP, VEHICULAR LAMP SYSTEM

(71) Applicant: STANLEY ELECTRIC CO., LTD., Tokyo (JP)

(72) Inventors: Yasuo Toko, Tokyo (JP); Ryotaro Owada, Tokyo (JP); Yoshifumi Takao, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 16/411,159

(22) Filed: May 14, 2019

(65) Prior Publication Data
US 2019/0360653 A1  Nov. 28, 2019

(30) Foreign Application Priority Data
May 24, 2018  (JP) .................................. 2018-099778

(51) Int. Cl.
*F21S 41/135* (2018.01)
*F21S 41/32* (2018.01)
(Continued)

(52) U.S. Cl.
CPC ........... *F21S 41/135* (2018.01); *F21S 41/255* (2018.01); *F21S 41/321* (2018.01); *F21S 41/645* (2018.01)

(58) Field of Classification Search
CPC .. F21S 41/00; F21S 41/10; F21S 41/12; F21S 41/125; F21S 41/13; F21S 41/135; F21S 41/14; F21S 43/00; F21W 2104/00
See application file for complete search history.

(56) References Cited

U.S. PATENT DOCUMENTS

2014/0071706 A1* 3/2014 Yagi ...................... F21S 41/285
                                                          362/520
2014/0362600 A1* 12/2014 Suckling ............... F21S 41/663
                                                          362/583
(Continued)

FOREIGN PATENT DOCUMENTS

DE   102014113700 A1    3/2016
DE   102016109530 A1   11/2017
(Continued)

OTHER PUBLICATIONS

Extended Search Report issued in European Application 19175497.7-1012 dated Jul. 16, 2019.

*Primary Examiner* — Anne M Hines
(74) *Attorney, Agent, or Firm* — Xsensus LLP (57) ABSTRACT

To reduce the optical members and the complexity of optical design. A vehicular lamp including: a light source; a light collecting member; a first polarizer advancing in a first direction a first component of the light, and advancing in a second direction a second component; a liquid crystal element disposed on one side of the first polarizer in the first direction; a second polarizer disposed on one side of the liquid crystal element in the first direction; a projection lens disposed on one side of the second polarizer in the first direction and projecting the first component to the front of an own vehicle; a reflecting member for reflecting the second component; where the first component is focused at a first focal point, the second component of the light is focused at a second focal point, and the liquid crystal element is disposed corresponding to the first focal point.

19 Claims, 4 Drawing Sheets

(51) Int. Cl.
    *F21S 41/255*    (2018.01)
    *F21S 41/64*     (2018.01)

(56) References Cited

U.S. PATENT DOCUMENTS

| | | | |
|---|---|---|---|
| 2015/0029409 A1* | 1/2015 | Chen | F21S 41/16 349/5 |
| 2015/0345729 A1* | 12/2015 | Liao | F21S 41/14 362/510 |
| 2017/0276980 A1* | 9/2017 | Kauschke | F21S 41/135 |

FOREIGN PATENT DOCUMENTS

| | | |
|---|---|---|
| EP | 1 351 015 A2 | 10/2003 |
| EP | 3 205 928 A1 | 2/2017 |
| GB | 1 421 404 A | 1/1976 |
| JP | 2011243366 A | 12/2011 |
| JP | 2012069295 A | 4/2012 |
| JP | 5418760 B2 | 2/2014 |
| JP | 2017-4661 A | 1/2017 |

\* cited by examiner

VEHICULAR LAMP, VEHICULAR LAMP SYSTEM

CROSS-REFERENCE TO RELATED APPLICATION

The present application claims priority to JP 2018-099778 filed May 24, 2018, the entire contents of which are incorporated herein by reference.

BACKGROUND OF THE INVENTION

Field of the Invention

The present invention relates to a vehicular lamp, etc. suitable for use as a vehicle headlamp, for example.

Description of the Background Art

Japanese Patent No. 5418760 discloses a vehicular lamp which includes: a light source; a first reflective polarizer where the first polarized light component of the irradiated light from the light source which oscillates in the direction of its own polarization transmission axis is transmitted and where the second polarized light component which oscillates in the direction other than its own polarization transmission axis direction is reflected; a liquid crystal element disposed in the light path of the first polarized light component and transmits the first polarized light component; a second reflective polarizer disposed in the light path of the first polarized light component transmitted through the liquid crystal element, where the first polarized light component is transmitted when it oscillates in the direction of its own polarization transmission axis and where the first polarized light component is reflected when it oscillates in the direction other than the direction of its own polarization transmission axis; a first optical system for forming a basic light distribution pattern using the second polarized light component reflected by the first reflective polarizer; a second optical system for forming a first additional light distribution pattern to be added to the basic light distribution pattern using the first polarized light component reflected by the second reflective polarizer; and a third optical system for forming a second additional light distribution pattern to be added to the basic light distribution pattern using the first polarized light component transmitted through the second reflective polarizer. According to the vehicular lamp of the above configuration, it is possible to prevent mechanical malfunction when switching between a low beam and a high beam.

However, the vehicular lamp described above has room for further improvement in that the number of optical members is relatively large.

Further, since there are at least two optical systems using reflected light to form the light distribution patterns, the optical design becomes complicated which also has room for further improvement.

In a specific aspect, it is an object of the present invention to provide a vehicular lamp or the like which is capable of reducing the number of optical members and reducing optical design complexity.

SUMMARY OF THE INVENTION

[1] A vehicular lamp according to one aspect of the present invention is a vehicular lamp for irradiating light in front of an own vehicle including: (a) a light source; (b) a light collecting member for collecting light from the light source; (c) a first polarizer which advances in a first direction a first component of the light from the light source collected by the light collecting member, and advances in a second direction which intersects the first direction a second component of the light from the light source; (d) a liquid crystal element disposed on the light emitting side of the first polarizer on the optical axis in the first direction; (e) a second polarizer disposed on the light emitting side of the liquid crystal element on the optical axis in the first direction; (f) a projection lens disposed on the light emitting side of the second polarizer on the optical axis in the first direction and projecting the first component of the light transmitted through the liquid crystal element and the second polarizer to the front of the own vehicle; (g) a reflecting member for reflecting the second component of the light generated by the first polarizer and advancing it to the front of the own vehicle; (h) where the first component of the light is focused at a first focal point which is a predetermined position on the optical axis in the first direction and where the second component of the light is focused at a second focal point which is a predetermined position between the first polarizer and the reflecting member; and (i) where the liquid crystal element is disposed corresponding to the position of the first focal point.

[2] A vehicular lamp system according to one aspect of the present invention includes the above-described vehicular lamp and a control device for controlling the operation of the light source and the liquid crystal element of the vehicular lamp.

According to the above configuration, it is possible to provide a vehicular lamp or the like which is capable of reducing the number of optical members and reducing optical design complexity.

DESCRIPTION OF THE PREFERRED EMBODIMENTS

Figure 1:
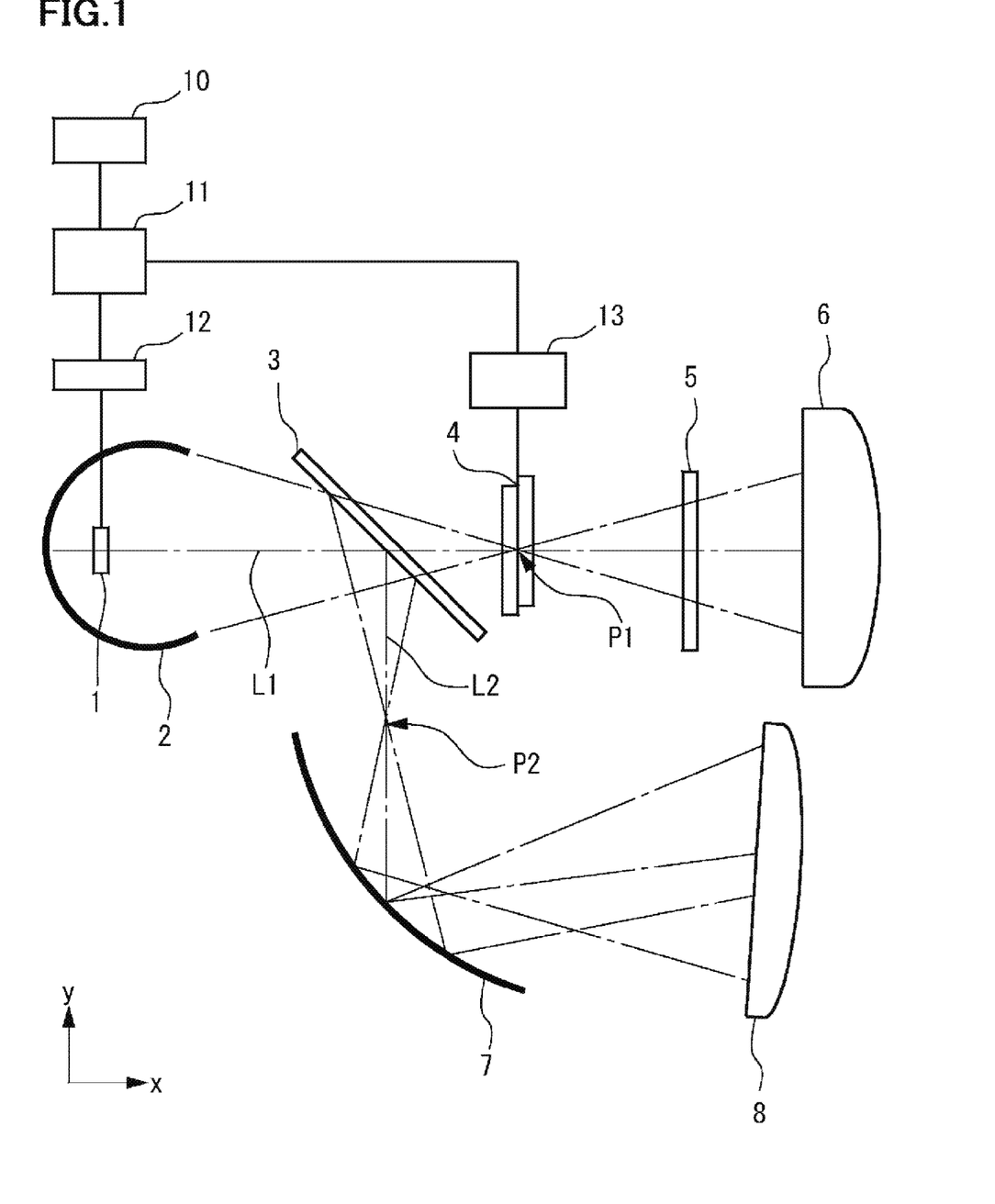
FIG. 1 is a diagram showing a configuration of a vehicular lamp system according to one embodiment.

FIG. 1 is a diagram showing a configuration of a vehicular lamp system according to one embodiment. The vehicular lamp system shown in FIG. 1 is configured to include a light source 1, a reflector (light collector) 2, a polarizing beam splitter (first polarizer) 3, a liquid crystal element 4, a polarizer (second polarizer) 5, a projection lens 6, a reflector (reflecting member) 7, a projection lens 8, a camera 10, a control part 11, a light source driving part 12, and a liquid crystal element driving part 13. This vehicular lamp system detects the position of a forward vehicle, a pedestrian, etc. existing around its own vehicle based on images captured by the camera 10, then based on the detection result, sets a certain range including the position of the forward vehicle, etc. as a non-irradiation range and sets the range other than the non-irradiation range as the light irradiation range, and performs selective light irradiation.

The light source 1 includes a white LED configured by combining a yellow phosphor with a light emitting element (LED) that emits blue light, for example. The light source 1 includes a plurality of white LEDs arranged in a matrix or a line, for example. Here, as the light source 1, in addition to LEDs, light sources generally used in vehicular lamp units such as light bulbs or discharge lamps can be used. The on/off state of the light source 1 is controlled by the control part 11 and the light source driving part 12. In the present embodiment, the light source 1 is arranged such that the light emitted therefrom is incident on the reflector 2.

The reflector 2 reflects the light emitted from the light source 1 to the direction in which the polarizing beam splitter 3 exists and directs the light to the polarizing beam splitter 3 along the optical axis L1 parallel to the x direction in the figure. The reflector 2 then collects the light so as to focus on the focal point P1 on the optical axis L1. Here, In FIG. 1, the x direction corresponds to the longitudinal direction of the vehicle and the y direction corresponds to the lateral direction of the vehicle or the vertical direction of the vehicle, for example. The specific structure of this reflector 2 is not particularly limited, but one having a reflective film made of metal such as aluminum or silver alloy formed on the surface of a resin or a glass substrate is suitably used, for example. Since a specular reflection state is desirable, it is preferable that the substrate surface be as smooth as possible.

The polarizing beam splitter 3 transmits the polarized light component of a specified direction of the incident light, and reflects the polarized light component of the direction other than the specified direction. The polarized light component reflected by the polarizing beam splitter 3 travels straight toward the reflector 7 along the optical axis L2 which is parallel to the y-axis in the figure, and is focused on the focal point P2 on the optical axis L2. As shown in the figure, the polarizing beam splitter 3 is a plate-like member, and is disposed on the optical axis L1 so that the incident surface (the surface facing the light source 1) is oblique to the optical axis L1. In the illustrated example, the polarizing beam splitter 3 is disposed at an angle of about 45 degrees with respect to the optical axis L1. As such a polarizing beam splitter 3, a wire grid type polarizer, a reflective type polarizer with an optical multilayer film, or the like can be used, for example. Here, the wire grid type polarizer is a polarizer in which a large number of extremely thin wires made of metal such as aluminum, etc. are arranged in one direction.

The liquid crystal element 4 has a plurality of individually controllable pixel regions (light control regions), for example, and the alignment state of liquid crystal molecules in the liquid crystal layer of each pixel region is variably controlled in accordance with the magnitude of the voltage applied to the liquid crystal layer provided by the liquid crystal element driving part 13. The polarized light component of the light (the first component of the light) from the light source 1 transmitted through the polarizing beam splitter 3 is incident on the liquid crystal element 4 and is transmitted, thereby forming an image having brightness and hue corresponding to the light irradiation range and the non-irradiation range described above. As shown in the figure, the liquid crystal element 4 is arranged on the light emitting side of the polarizing beam splitter 3 on the optical axis L1, and is arranged such that the position of the liquid crystal layer corresponds to the focal point P1. Further, as shown in the figure, it is preferable that the liquid crystal element 4 is not in contact with any of the polarizing beam splitter 3 and the polarizer 5 and is disposed apart from each other with a gap therebetween. In addition, as shown in the figure, it is preferable that the liquid crystal element 4 is disposed so that the light incident surface which is the surface facing the polarizing beam splitter 3, is substantially orthogonal to the optical axis L1. Further, the liquid crystal molecules of the liquid crystal layer in liquid crystal element 4 are substantially vertically aligned when no voltage is applied, for example.

The polarizer 5 is an absorption type polarizer made of a general organic material (iodine type, dye type), or a wire grid polarizer (absorption type or reflection type) made of an inorganic material, for example, and is disposed on the light emitting side of the liquid crystal element 4 on the optical axis L1. This polarizer 5 is disposed so that the polarizing axis thereof and the polarizing axis of the polarizing beam splitter 3 described above are substantially orthogonal to each other.

The projection lens 6 spreads the image (having brightness and hue corresponding to the light irradiation range and the non-irradiation range) formed by the light passing through the liquid crystal element 4 suitable for headlight light distribution and projects it forward of its own vehicle. As the projection lens 6, a reversed projection type projector lens is used, for example. The projection lens 6 is disposed on the light emitting side of the polarizer 5 on the optical axis L1 and is disposed such that its focal point corresponds to the focal point P1 described above. Here, the position of the focal point of the projection lens 6 may be slightly offset from the focal point P1 so that the projected image does not become too sharp. Also, an image shifter may be added to the projection lens 6. The image shifter referred to here is a device that spreads the projected image in the vertical and horizontal directions by using a plurality of prisms (refer to Japanese Unexamined Patent Application Publication No. 2017-4661, for example). Regarding the numerical aperture NA of the projection lens 6, when 0 is defined as the angle formed between the central axis of the projection lens 6 and the most inclined incident light relative to the central axis, NA=sin 0 is established (same applies to the projection lens 8 described hereafter).

When the polarized light component (second component of light) reflected by the polarizing beam splitter 3 is incident on the reflector 7, the reflector 7 reflects this polarized light component and emits it to the projection lens 8. As shown in the figure, the polarized light component reflected by the polarizing beam splitter 3 is focused on the focal point P2 at a predetermined position on the optical axis L2 which is between the polarizing beam splitter 3 and the reflector 7. Thus, the reflector 7 can be designed by regarding the position of the focal point P2 as a virtual light source position, and the optical design of the reflector 7 can be facilitated. The specific structure of this reflector 7 is not particularly limited, but one having a reflective film made of metal such as aluminum or silver alloy formed on the surface of a resin or a glass substrate is suitably used, for example. Since a specular reflection state is desirable, it is preferable that the substrate surface be as smooth as possible.

The projection lens 8 collects the light component reflected by the reflector 7 and spreads the light component suitable for headlight light distribution and projects it forward of its own vehicle. Here, note that this projection lens 8 may be omitted. That is, the light component reflected by the reflector 7 may be irradiated forward of its own vehicle as it is.

The camera 10 captures the front of its own vehicle and outputs an image (information) thereof, and is disposed at a predetermined position (for example, an upper portion inside the windshield) in the own vehicle. Here, if a camera is pre-installed in the vehicle for other applications (for example, an automatic brake system etc.), then this camera may be shared for the above application.

The control part 11 performs image processing based on the image obtained by the camera 10 which captures the front space of its own vehicle, thereby detecting the position/region of a preceding vehicle, a pedestrian or the like (target object) existing in the front space. Then, a light distribution pattern is set with the detected position/region of the preceding vehicle or the like as the non-irradiation range and the other region as the light irradiation range. The control part 11 further generates a control signal for forming an image corresponding to the light distribution pattern and provides it to the liquid crystal element driving part 13. Further, the control part 11 generates a control signal for controlling the operation of the light source 1 and provides the control signal to the light source driving part 12. This control part 11 is realized by executing a predetermined operation program in a computer system having a CPU, a ROM, a RAM, and the like, for example.

The light source driving part 12 controls the operation of the light source 1 by supplying a driving voltage for driving the light source 1 based on the control signal provided from the control part 11.

The liquid crystal element driving part 13 controls the alignment state of the liquid crystal layer in each pixel region of the liquid crystal element 4 by supplying a driving voltage for driving the liquid crystal element 4 based on the control signal provided from the control part 11.

Here, in the vehicular lamp system shown in FIG. 1, the "vehicular lamp" is configured to include the light source 1, the reflector 2, the polarizing beam splitter 3, the liquid crystal element 4, the polarizer 5, the projection lens 6, the reflector 7, and the projection lens 8. These are housed in a case (not shown) and installed in the front part of the vehicle, for example. Further, the "control device" is configured to include the camera 10, the control part 11, the light source driving part 12, and the liquid crystal element driving part 13.

The vehicular lamp system of the present embodiment has an advantage such that the light utilization efficiency of the vehicular lamp can be made relatively high. Specifically, about 40% of the light emitted from the light source 1 transmits through the polarizing beam splitter 3 and enters the liquid crystal element 4, and transmits through the liquid crystal element 4 and the polarizer 5 where a loss of about 5% occurs. Thereby, about 35% of the light emitted from the light source 1 enters the projection lens 6 and is projected to the front of the own vehicle. Further, about 40% of the light emitted from the light source 1 is reflected by the polarizing beam splitter 3 to be incident on the reflector 7, and a loss of about 4% occurs due to the reflection. Thereby, about 36% of the light emitted from the light source 1 enters the projection lens 8 and is projected to the front of the own vehicle. Therefore, as a whole, about 71% of the light emitted from the light source 1 can be used. Further, even if the light emitted from the projection lens 6 cannot be obtained due to a failure of the liquid crystal element 4 or the like, as long as the light source 1 is in operation, light emitted from the projection lens 8 can be obtained. Similarly, at the time of starting the vehicle, when the ambient temperature is extremely low causing the operating speed of the liquid crystal element 4 to decrease, and the emitted light from the projection lens 6 becomes difficult to obtain, light emitted from the projection lens 8 can be reliably obtained.

Figure 2:
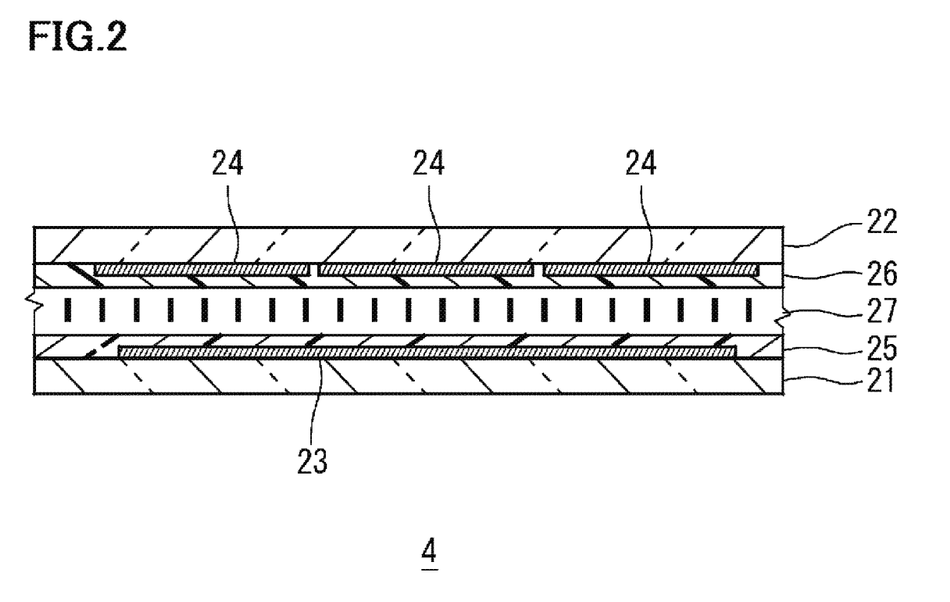
FIG. 2 is a schematic cross-sectional view showing the configuration of the liquid crystal element.

FIG. 2 is a schematic cross-sectional view showing the configuration of the liquid crystal element. The liquid crystal element 4 is configured to include a first substrate 21 and a second substrate 22 disposed opposite to each other, a counter electrode (common electrode) 23 provided on the first substrate 21, and a plurality of pixel electrodes (individual electrodes) 24 provided on the second substrate 22, and a liquid crystal layer 27 disposed between the first substrate 21 and the second substrate 22.

Each of the first substrate 21 and the second substrate 22 is a rectangular substrate in a plane view, and is disposed to face each other. As each substrate, a transparent substrate such as a glass substrate or a plastic substrate can be used, for example. A large number of spacers are uniformly distributed between the first substrate 21 and the second substrate 22, for example, and these spacers keep the substrate gap at a desired size (for example, about a few micro meters). As spacers, plastic balls that can be dispersed by a dry type spacer spraying device may be used, or columnar bodies made of a resin material or the like provided in advance on a substrate may be used.

The counter electrode (common electrode) 23 is provided on one surface side of the first substrate 21. The counter electrode 23 is integrally provided to face each pixel electrode 24 of the second substrate 22. The counter electrode is configured by appropriately patterning a transparent conductive film such as indium tin oxide (ITO), for example.

The plurality of pixel electrodes (individual electrodes) 24 is provided on one surface side of the second substrate 22. These pixel electrodes 24 are configured by appropriately patterning a transparent conductive film such as indium tin oxide (ITO), for example. Each of the pixel electrodes 24 has a rectangular outer edge shape in a plane view, and is arranged in a matrix along the x direction and the y direction, for example. Each of the overlapping regions of the counter electrode 23 and the pixel electrodes 24 comprises the pixel region (light control region) described above.

The first alignment film 25 is provided on one surface side of the first substrate 21 to cover the counter electrode 23. Similarly, the second alignment film 26 is provided on one surface side of the second substrate 22 to cover each pixel electrode 24. The first alignment film 25 and the second alignment film 26 are for regulating the alignment direction of the liquid crystal molecules of the liquid crystal layer 27. For example, as each of the alignment films 25 and 26, a vertical alignment film which regulates the liquid crystal layer 27 to a vertical alignment state is used. Each alignment film is subjected to uniaxial alignment treatment such as rubbing treatment, and it has uniaxial alignment regulation force that defines the alignment of the liquid crystal molecules of the liquid crystal layer 27 in that direction. The direction of the alignment treatment on each alignment film is set to be alternate (anti-parallel), for example.

The liquid crystal layer 27 is provided between the first substrate 21 and the second substrate 22. In this embodiment, the liquid crystal layer 27 contains a nematic liquid crystal material having fluidity with negative dielectric anisotropy $\Delta\varepsilon$, has a high isotropic phase transition temperature (for example, $\Delta 130$ degrees centigrade) and contains no chiral material. The liquid crystal layer 27 of this embodiment is uni-axially aligned in which the alignment direction of the liquid crystal molecules is inclined in one direction when no voltage is applied, and is set to be substantially vertically aligned with respect to each substrate surface having a pretilt angle within a range of 88 degrees or more and less than 90 degrees.

The liquid crystal element 4 of the present embodiment has several tens to several hundreds of pixel regions in which each region is defined as the region where the counter electrode 23 and each pixel electrode 24 overlap in a plane view, and these pixel regions are arranged in a matrix. In the present embodiment, the shape of each pixel region is a square, for example, but the shape of each pixel region can be set arbitrarily, such as a mixture of rectangular and square shapes. Further, although the pixel regions are arranged in a matrix, it is not mandatory to arrange them in a matrix. The counter electrode 23 and each pixel electrode 24 are connected to the liquid crystal element driving part 13 via wiring members which are not shown, and are statically driven, for example. The applied voltage at that time is a square wave of about 100 Hz to 1 kHz, and the voltage range is about 0V to 50V, for example.

Figure 3:
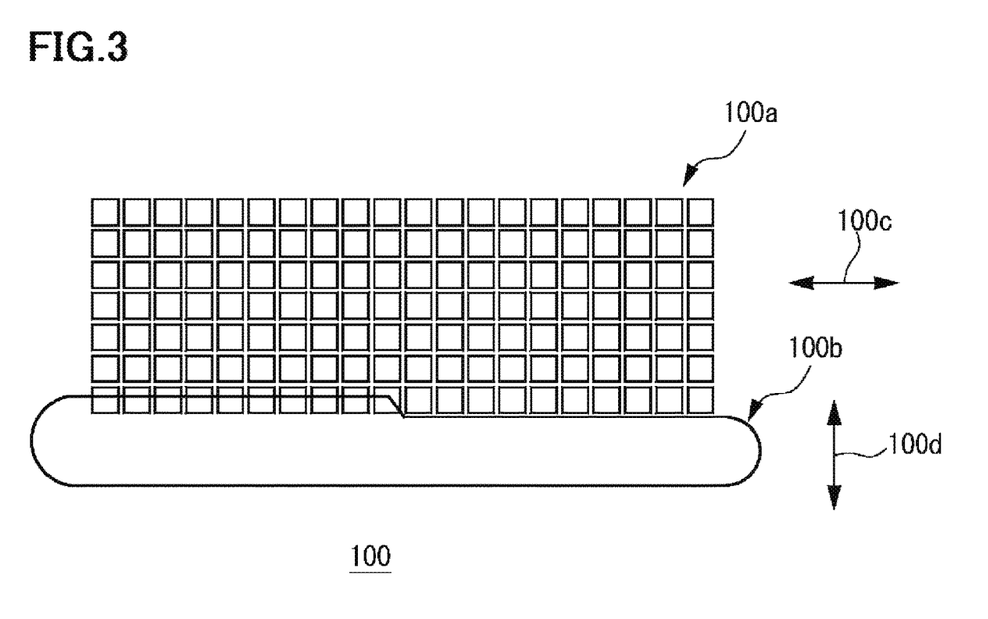
FIG. 3 is a view schematically showing an example of an irradiation pattern formed in front of an own vehicle by the vehicular lamp system.

FIG. 3 is a view schematically showing an example of an irradiation pattern formed in front of the own vehicle by the vehicular lamp system. In FIG. 3, the irradiation pattern (projected image) on the virtual screen several tens of meters ahead of the vehicle is schematically shown. In the figure, irradiation pattern 100a including a plurality of rectangular regions arranged in a matrix along the vertical and horizontal direction respectively is the irradiation pattern of the light corresponding to a high beam. This irradiation pattern 100a is formed by the light component transmitting through the polarizing beam splitter 3, the liquid crystal element 4, and the polarizer 5, and then projected by the projection lens 6 toward the front of the own vehicle. Each rectangular region included in the irradiation pattern 100a is a light distribution region in which the light amount of the transmitted light can be individually controlled by the liquid crystal element 4, and in this example, each rectangular region corresponds to each pixel region of the liquid crystal element 4 one to one. Further, the horizontally long irradiation pattern 100b disposed on the lower side of the irradiation pattern 100a in the figure is an irradiation pattern of light corresponding to a low beam. This irradiation pattern 100b is formed by the light component reflected by the polarizing beam splitter 3 and the reflector 7, and then projected by the projection lens 8 toward the front of the own vehicle.

Further, as shown in FIG. 3, the irradiation pattern 100a which corresponds to the high beam is a linearly polarized light, and its polarization direction 100c is a direction which does not cross the road surface direction (horizontal direction). On the other hand, the irradiation pattern 100b which corresponds to the low beam is a linearly polarized light, and its polarization direction 100d is a direction which cross the road surface direction (vertical direction). That is, the irradiation pattern 100a which corresponds to the high beam and the irradiation pattern 100b which corresponds to the low beam are linearly polarized light respectively and the polarization directions are different from each other. Further, since the polarization direction 100d of the low beam irradiation pattern 100b is vertical to the road surface, it is possible to reduce road surface reflection during rainy weather, thereby suppressing glare to oncoming vehicles, pedestrians, etc. Here, the irradiation pattern 100b may be a elliptically polarized light having a major axis substantially in the same direction as the illustrated polarization direction 100d.

According to the embodiment as described above, it is possible to obtain a vehicular lamp and a vehicular lamp system including the same where the number of optical members are reduced and the complexity of optical design is reduced. Specifically, in the vehicular lamp of the above embodiment, there is only one optical system using reflected light, which is the optical system including the polarizing beam splitter 3 and the reflector 7. And with regard to the other optical system, the light generated by the light source 1 and the reflector 2 always moves straight along the optical axis L1, thereby transmitting through the polarizing beam splitter 3, the liquid crystal element 4, the polarizer 5 and the projection lens 6. Thus, the number of parts can be reduced, and the optical design is facilitated since the number of optical system using reflected light is small.

It should be noted that this invention is not limited to the subject matter of the foregoing embodiment, and can be implemented by being variously modified within the scope of the present invention as defined by the appended claims.

Figure 4:
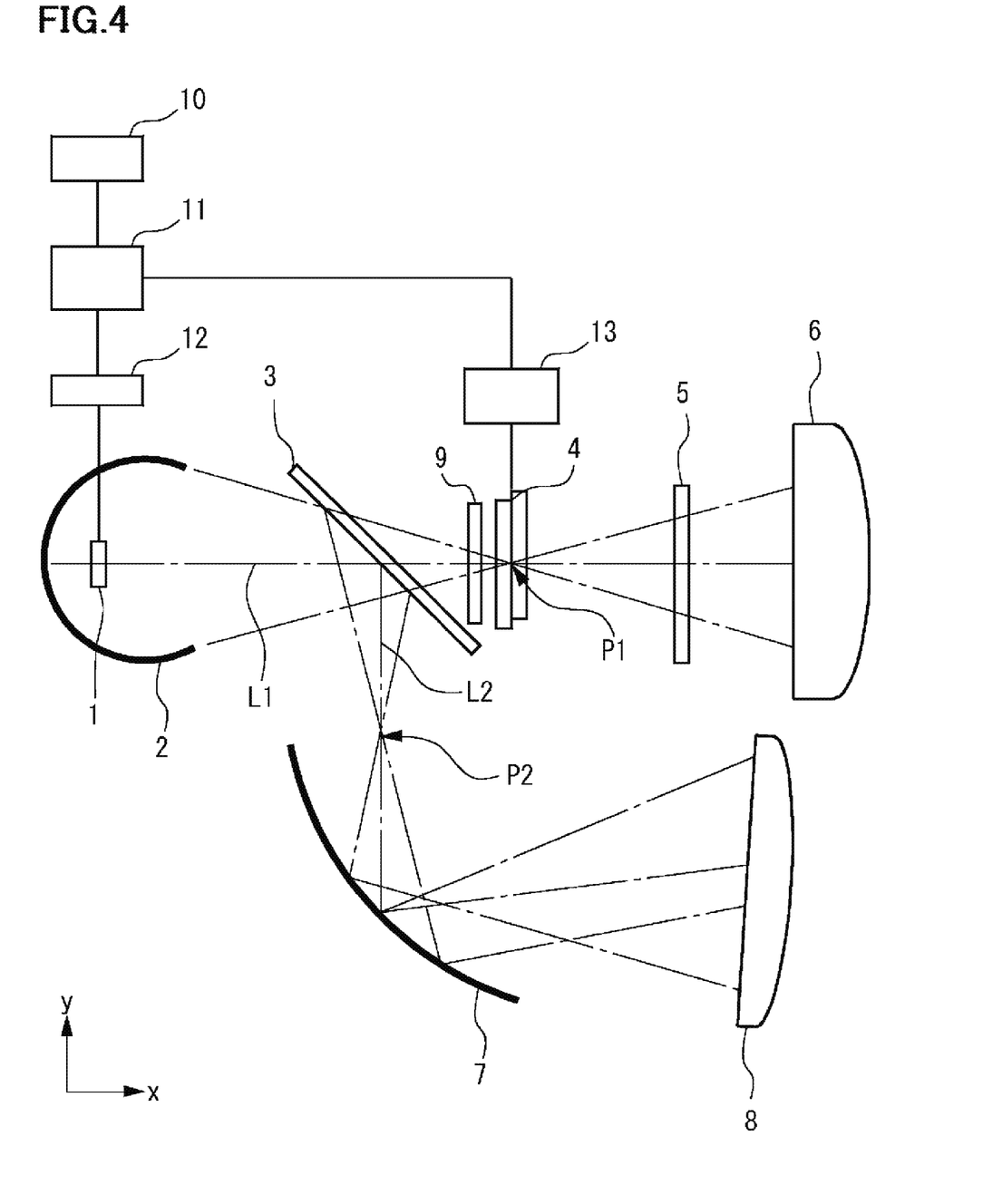
FIG. 4 is a diagram showing a configuration of the vehicular lamp system according to a modified example.

FIG. 4 is a diagram showing a configuration of the vehicular lamp system according to a modification example. For example, as shown in FIG. 4, a polarizer (third polarizer) 9 may be further provided between the polarizing beam splitter 3 and the liquid crystal element 4 in the vehicular lamp. By providing the polarizer 9 in this way, even when the degree of polarization of the polarizing beam splitter 3 is insufficient, it can be compensated. In this case, since the polarization axis of the polarizer 9 and the polarization direction of the light component (first component) emitted from the polarizing beam splitter 3 can be aligned in substantially the same direction, the polarizer 9 does not absorb much light. Thus, it is possible to use an absorption type polarizer made of low cost organic material (iodine type, dye type). Here, as the polarizer 9, a wire grid type polarizer, a reflection type polarizer using an optical multi-layer film, or the like may be used. Further, the polarizer 9 may be tilted in the same manner as the polarizing beam splitter 3 so that a portion of the light can be reflected toward the reflector 7.

Figure 5:
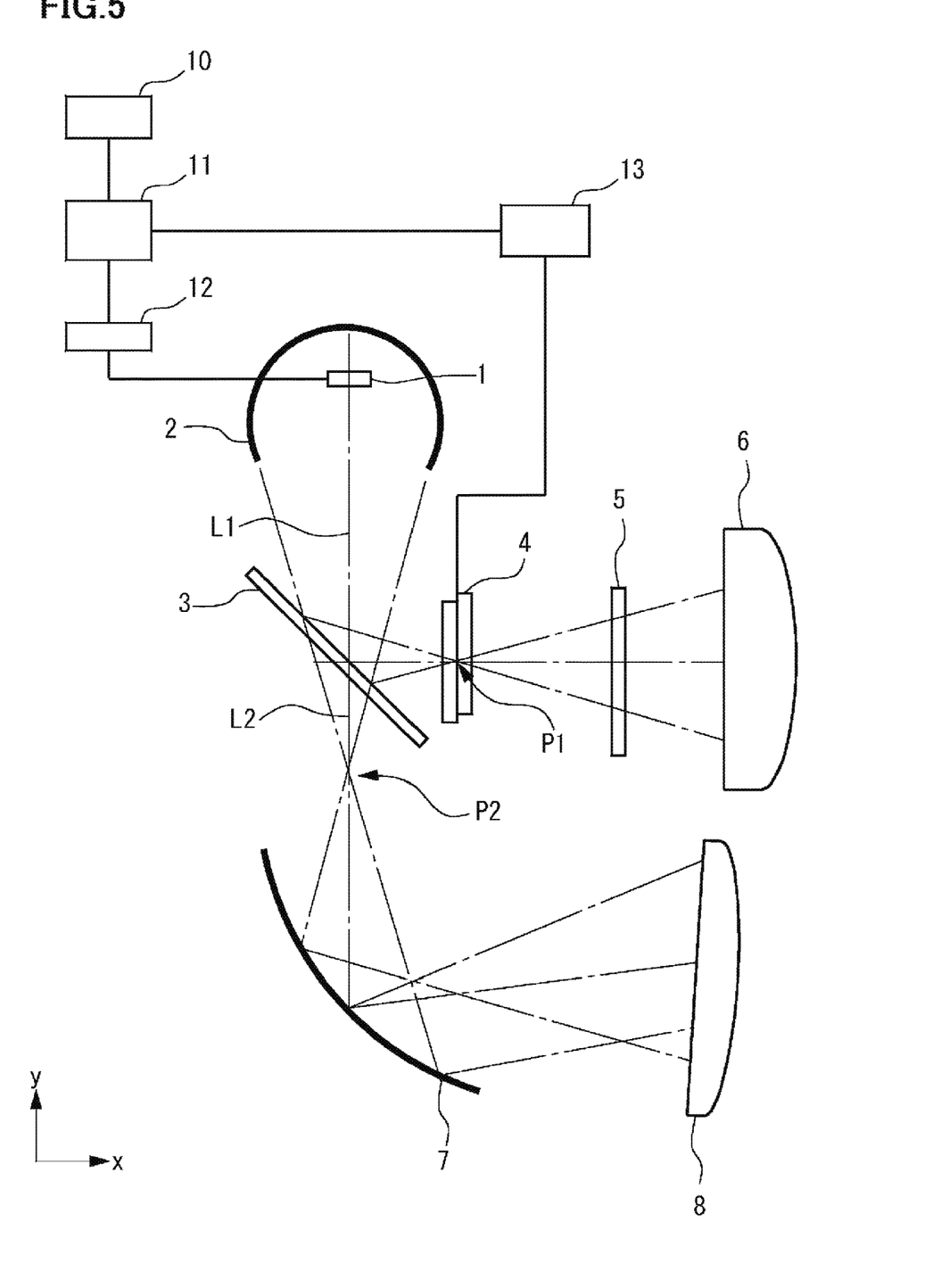
FIG. 5 is a diagram showing a configuration of the vehicular lamp system according to a modified example.

FIG. 5 is a diagram showing a configuration of a vehicular lamp system according to a modification example. In the above-described embodiment, the light transmitted through the polarizing beam splitter 3 is made incident on the liquid crystal element 4 and the light reflected by the polarizing beam splitter 3 is made incident on the reflector 7, but these relationships may be reversed. Specifically, in the vehicular lamp system exemplified in FIG. 5, the polarized light component reflected by the polarizing beam splitter 3 moves straight toward the liquid crystal element 4 along an optical axis parallel to the x-axis in the figure, and forms a focal point P1 at the position of the liquid crystal layer of the liquid crystal element 4. The polarizing beam splitter 3 is disposed at an angle of about 45 degrees with respect to the optical axis L1 of the light incident from the light source 1. Further, the polarized light component transmitted through the polarizing beam splitter 3 move straight toward the reflector 7 along the optical axis L2 parallel to the y-axis in the figure, and forms a focal point P2 between the polarizing beam splitter 3 and the reflector 7, and is reflected by the reflector 7 and incident on the projection lens 8. Even in such a configuration, it is possible to obtain a vehicular lamp and a vehicular lamp system including the same where the number of optical members are reduced and the complexity of optical design is reduced.

Also, in the above-described embodiment, although a polarizing beam splitter, etc. is introduced as an example of the first polarizer, the first polarizer is not limited thereto. For example, the first polarizer may be configured by combining a mirror that transmits a part of incident light and reflects a part of the light (so-called a half mirror) and a polarizer. In this case, it is preferable that the half mirror is placed closer to the light source 1 and the polarizer is placed closer to the liquid crystal element.

Further, in the above-described embodiment, although the reflector 2 is introduced as an example of the light collecting member for collecting the light from the light source 1 and focusing on the focal point P1, the light collecting member is not limited thereto. For example, an appropriately designed condensing lens may be used, or a combination of such a condensing lens and a reflector may be used.

Further, in the vehicular lamp of the above-described embodiment, an optical compensator may be provided between the polarizing beam splitter 3 and the liquid crystal element 4, or between the liquid crystal element 4 and the polarizer 5 in order to perform viewing angle compensation. As an optical compensator in this case, for example, a quarter wavelength plate or a half wavelength plate can be used. For each wavelength plate, a plate using an organic material such as polycarbonate or cycloolefin may be used, or a plate using an inorganic material such as a quartz crystal or a metal oxide film may be used. When using quartz crystals, a desired phase difference can be obtained by overlapping a plurality of quartz crystals having different thicknesses in different phase directions. An optical compensator using an inorganic material is preferable for use as a vehicular lamp because it is superior in heat resistance. When providing an optical compensator using an organic material, it is preferable to separate it from the polarizing beam splitter 3 and the polarizer 5 without bringing them into close contact. The optical compensator may be bonded to the outside of either or both of the first substrate and the second substrate of the liquid crystal element 4.

Further, in the above-described embodiment, a vertical alignment mode liquid crystal element is used as an example of the liquid crystal element, but the liquid crystal element is not limited thereto. As a liquid crystal element, various modes/types may be used such as a twisted nematic alignment mode (TN type), a super twisted nematic alignment mode (STN type), or a in-plane switching mode (iPS type), for example. Further, the liquid crystal element drive system is not limited to the static drive system exemplified in the above embodiment, and various systems such as an active matrix drive system using thin film transistors, etc., or a multiplex drive system can be adopted, for example.

Further, although the above-described embodiment exemplifies a vehicular lamp system for performing selective light irradiation forward of the own vehicle, the scope of application of the present invention is not limited thereto. For example, the present invention is applicable to a vehicular lamp system corresponding to various applications such as an automatic leveling device that adjusts the optical axis direction according to the vehicle attitude, or an Adaptive Front-Lighting System (AFS) that emits light in the advancing direction when the vehicle is cornering.

What is claimed is:
1. A vehicular lamp for irradiating light in front of an own vehicle comprising:
a light source;
a light collecting member for collecting light from the light source;
a first polarizer which advances in a first direction a first component of the light from the light source collected by the light collecting member, and advances in a second direction which intersects the first direction a second component of the light from the light source;
a liquid crystal element disposed on the light emitting side of the first polarizer on the optical axis in the first direction;
a second polarizer disposed on the light emitting side of the liquid crystal element on the optical axis in the first direction;
a projection lens disposed on the light emitting side of the second polarizer on the optical axis in the first direction and projecting the first component of the light transmitted through the liquid crystal element and the second polarizer to the front of the own vehicle;
a reflecting member for reflecting the second component of the light generated by the first polarizer and advancing it to the front of the own vehicle;
wherein the first component of the light is focused at a first focal point which is a predetermined position on the optical axis in the first direction,
wherein the second component of the light is focused at a second focal point which is a predetermined position between the first polarizer and the reflecting member, and
wherein the liquid crystal element is disposed corresponding to the position of the first focal point.

2. The vehicular lamp according to claim 1,
wherein the first direction is a direction substantially parallel to the traveling direction of the light of the light source collected by the light collecting member.

3. The vehicular lamp according to claim 2,
wherein the first polarizer and the liquid crystal element are spaced apart without being in close contact with each other, and
wherein the liquid crystal element and the second polarizer are spaced apart without being in close contact with each other.

4. The vehicular lamp according to claim 2,
wherein the polarization direction of the first component of the light emitting from the projection lens and the polarization direction of the second component of the light emitting from the reflecting member are different from each other.

5. The vehicular lamp according to claim 2;
wherein the first polarizer is a polarizing beam splitter.

6. The vehicular lamp according to claim 2,
wherein the liquid crystal element is disposed such that the light incident surface is substantially orthogonal to the optical axis in the first direction.

7. The vehicular lamp according to claim 2 further comprising:
a third polarizer disposed between the first polarizer and the liquid crystal element.

8. The vehicular lamp according to claim 1,
wherein the first direction is a direction intersecting the traveling direction of the light of the light source collected by the light collecting member.

9. The vehicular lamp according to claim 8,
wherein the first polarizer and the liquid crystal element are spaced apart without being in close contact with each other, and
wherein the liquid crystal element and the second polarizer are spaced apart without being in close contact with each other.

10. The vehicular lamp according to claim 8;
wherein the first polarizer is a polarizing beam splitter.

11. The vehicular lamp according to claim 8,
wherein the liquid crystal element is disposed such that the light incident surface is substantially orthogonal to the optical axis in the first direction.

12. The vehicular lamp according to claim 8 further comprising:
   a third polarizer disposed between the first polarizer and the liquid crystal element.

13. The vehicular lamp according to claim 1,
   wherein the first polarizer and the liquid crystal element are spaced apart without being in close contact with each other, and
   wherein the liquid crystal element and the second polarizer are spaced apart without being in close contact with each other.

14. The vehicular lamp according to claim 1,
   wherein the polarization direction of the first component of the light emitting from the projection lens and the polarization direction of the second component of the light emitting from the reflecting member are different from each other.

15. The vehicular lamp according to claim 1,
   wherein the polarization direction of the first component of the light emitting from the projection lens and the polarization direction of the second component of the light emitting from the reflecting member are different from each other.

16. The vehicular lamp according to claim 1;
   wherein the first polarizer is a polarizing beam splitter.

17. The vehicular lamp according to claim 1,
   wherein the liquid crystal element is disposed such that the light incident surface is substantially orthogonal to the optical axis in the first direction.

18. The vehicular lamp according to claim 1 further comprising:
   a third polarizer disposed between the first polarizer and the liquid crystal element.

19. A vehicular lamp system comprising:
   the vehicular lamp according to claim 1, and
   a control device for controlling the operation of the light source and the liquid crystal element of the vehicular lamp.

* * * * *